United States Patent
Zhao

(10) Patent No.: US 9,715,065 B2
(45) Date of Patent: Jul. 25, 2017

(54) MULTI-FUNCTIONAL SPLICING CLAMP

(75) Inventor: Yangri Zhao, Weihai (CN)

(73) Assignees: Inno Instrument (China), Inc., Wei Hai (CN); Inno Instrument, Inc., Incheon (KR)

( * ) Notice: Subject to any disclaimer, the term of this patent is extended or adjusted under 35 U.S.C. 154(b) by 352 days.

(21) Appl. No.: 14/004,817

(22) PCT Filed: Apr. 6, 2012

(86) PCT No.: PCT/CN2012/000447
§ 371 (c)(1),
(2), (4) Date: Sep. 12, 2013

(87) PCT Pub. No.: WO2013/143030
PCT Pub. Date: Oct. 3, 2013

(65) Prior Publication Data
US 2015/0123330 A1    May 7, 2015

(30) Foreign Application Priority Data
Mar. 31, 2012   (CN) .................... 2012 2 0129316 U

(51) Int. Cl.
G02B 6/255   (2006.01)
(52) U.S. Cl.
CPC .................. G02B 6/2555 (2013.01)
(58) Field of Classification Search
CPC .. B25B 7/18; B25B 3/00; B25B 13/24; G02B 6/2555; G02B 6/2556; G02B 6/2557; G02B 6/25; G02B 6/24; G02B 6/4439
USPC ........................ 269/3, 6, 95, 143, 8
See application file for complete search history.

(56) References Cited

U.S. PATENT DOCUMENTS

| | | | | |
|---|---|---|---|---|
| 4,509,257 A | * | 4/1985 | Moriyama | H02G 1/1204 29/825 |
| 4,750,804 A | * | 6/1988 | Osaka | G02B 6/3652 385/137 |
| 5,024,363 A | * | 6/1991 | Suda | G02B 6/25 225/2 |
| 6,754,426 B2 | * | 6/2004 | Lee | G02B 6/25 225/93 |
| 7,292,765 B2 | * | 11/2007 | Sato | G02B 6/2551 385/136 |

(Continued)

FOREIGN PATENT DOCUMENTS

| | | | | |
|---|---|---|---|---|
| CN | WO2013116959 | * | 8/2013 | ........... G02B 6/2551 |
| JP | 3132149 U | | 5/2007 | |

(Continued)

OTHER PUBLICATIONS

Notification of Reason for Refusal (Office Action) dated May 19, 2016, issued by the Korean Intellectual Property Office in related Korean Patent Application No. KR-20-2012-7000055, with English translation (10 pages).

*Primary Examiner* — Joseph J Hail
*Assistant Examiner* — J Stephen Taylor
(74) *Attorney, Agent, or Firm* — Osha Liang LLP

(57) ABSTRACT

A multi-functional splicing clamp for use in a fiber splicing device includes a clamp body and a clamp cover body, wherein one side of said clamp body is pivotally connected to the clamp cover body. The clamp body is provided with a fiber-carrying pad, and the clamp cover body is provided with an abutment structure that can abut said fiber-carrying pad.

7 Claims, 2 Drawing Sheets

(56) References Cited

U.S. PATENT DOCUMENTS

2010/0260458 A1* 10/2010 Sato .................... G02B 6/2555
                                                              385/96
2013/0236146 A1*  9/2013 Takayanagi .......... G02B 6/2553
                                                              385/96

FOREIGN PATENT DOCUMENTS

JP       2007-298705 A    11/2007
KR       2010-0113988 A   10/2010

* cited by examiner

MULTI-FUNCTIONAL SPLICING CLAMP

BACKGROUND OF INVENTION

Field of the Invention

The present invention relates to the technical field of fiber splicing devices, especially to new multifunctional splicing clamps for fixing optical fibers in the fiber splicing processes.

Background Art

Optical fibers generally include rubber-insulated cables, jumper wires, 2.5 mm optical cables, 900 um fibers, 250 um fibers, 80 um fibers, etc. Among these, there are big diameter differences between the 3 mm rubber-insulated cables, jumper wires, 2.5 mm optical cables and the 900 um fibers, 250 um fibers, 80 um fibers. Currently, there is no clamp that can simultaneously match these wires with such big diameter differences. Accordingly, when different types of optical fibers are spliced, one needs to swap different matched clamps, resulting in inconvenient operations and low efficiencies. Furthermore, when optical fibers are to be spliced, they are first placed on the clamp of a cutting knife for cutting. Then, the cut optical fibers and the clamp are put into a fiber fusion splicer, and they are held in place while the fibers are spliced. That is, in the process of each fiber splicing, the optical fiber and the clamp need to be removed from the cutting knife, and then the fiber and clamp are fixed and installed in the fusion splicer before the fiber splicing operation is carried out. In the above-described removal and installation processes, the fine optical fibers are prone to damages. The working processes are not only complicated and time-consuming, but also require high precision in these operations, resulting in inconvenient operations and low efficiencies.

SUMMARY OF INVENTION

An object of the present invention is to provide a new multi-functional splicing clamp in order to solve the following technical problems: in the existing technology, there are big diameter gaps between the rubber-insulated cables, jumper wires, 2.5 mm optical cables and the 900 um fibers, 250 um fibers, 80 um fibers. Currently, there is no clamp that can simultaneously match wires or cables with such big diameter differences. Therefore, when different types of optical fibers are spliced, matched clamps need to be used and replaced, resulting in inconvenient operations and low efficiencies.

The objects of the present invention are realized through the following technical solutions:

A new multi-functional splicing clamp, for use in a fiber splicing device, comprises a clamp body and a clamp cover body, wherein one side of said clamp body is pivotally connected to the clamp cover body, and wherein said clamp body is provided with a fiber-carrying pad and said clamp cover body is provided with an abutment structure that can abut said fiber-carrying pad.

Further, said abutment structure includes an abutment pad, which is connected to the clamp cover body via an elastic body.

Further, said clamp body is provided with a first groove, on which said fiber-carrying pad is installed.

Further, said clamp body is further provided with a fiber-carrying slot, which is linked with said first groove; wherein the fiber-carrying slot has a bottom and the first groove has a bottom, wherein the bottom of said fiber-carrying slot is higher than the bottom of said first groove, and said clamp cover body is provided with an abutment body which can abut said fiber-carrying slot.

Further, said abutment structure further includes a limiter body, which is symmetrically provided with a first convex body and a second convex body; wherein said abutment pad is installed on said limiter body and is located between said first convex body and said second convex body; wherein said first convex body and said second convex body protrude out of said abutment pad, and said limiter body is connected to said clamp cover body through said elastic body.

Further, said elastic body includes a spring, one end of which is connected to said limiter body and the other end is connected to said clamp cover body.

Further, the side face of said first groove is provided with a first empty-avoiding slot and a second empty-avoiding slot; wherein said first empty-avoiding slot matches with said first convex body, and wherein said second empty-avoiding slot matches with said second convex body.

Further, said fiber-carrying pad, said abutment pad and said abutment body are rubber bodies.

Further, said spring is a mechanical spring with a tensile force of 2.8N.

Further, said clamp cover body is further provided with a fiber press seat, on which said abutment body is installed.

Further, said clamp body is further provided with a first stop block and a second stop block, which are symmetrically disposed on the terminal side of said first groove.

Further, said clamp cover body and said clamp body may be connected magnetically; said clamp cover body is a magnetizer, and said clamp body is provided with several magnetic bodies which could match with said magnetizer.

Compared to the prior art, the present invention has the following advantages:

1. The new multi-functional splicing clamp of the present invention could simultaneously match with wire cables with big diameter gaps such as rubber-insulated cables, jumper wires, 2.5 mm optical cables, 900 um optical fibers, 250 um fibers, and 80 um fibers. When different types of optical fibers are spliced, the clamp need not to be replaced, resulting in convenient operations and improved efficiencies.

2. The new multi-functional splicing clamp of the present invention may be directly installed in the optical fiber fusion splicer, and the cut optical fibers may be spliced after being put in the clamp, thus avoiding complicated processes in the prior art where the optical fibers and clamp need to be removed together from the cutting knife and then the removed fiber and clamp are fixed together and installed in the fusion splicer for fiber splicing, resulting in convenient operations and higher efficiencies.

DETAILED DESCRIPTION

The following explains the present invention in detail with referenced to the drawings.

Figure 1:
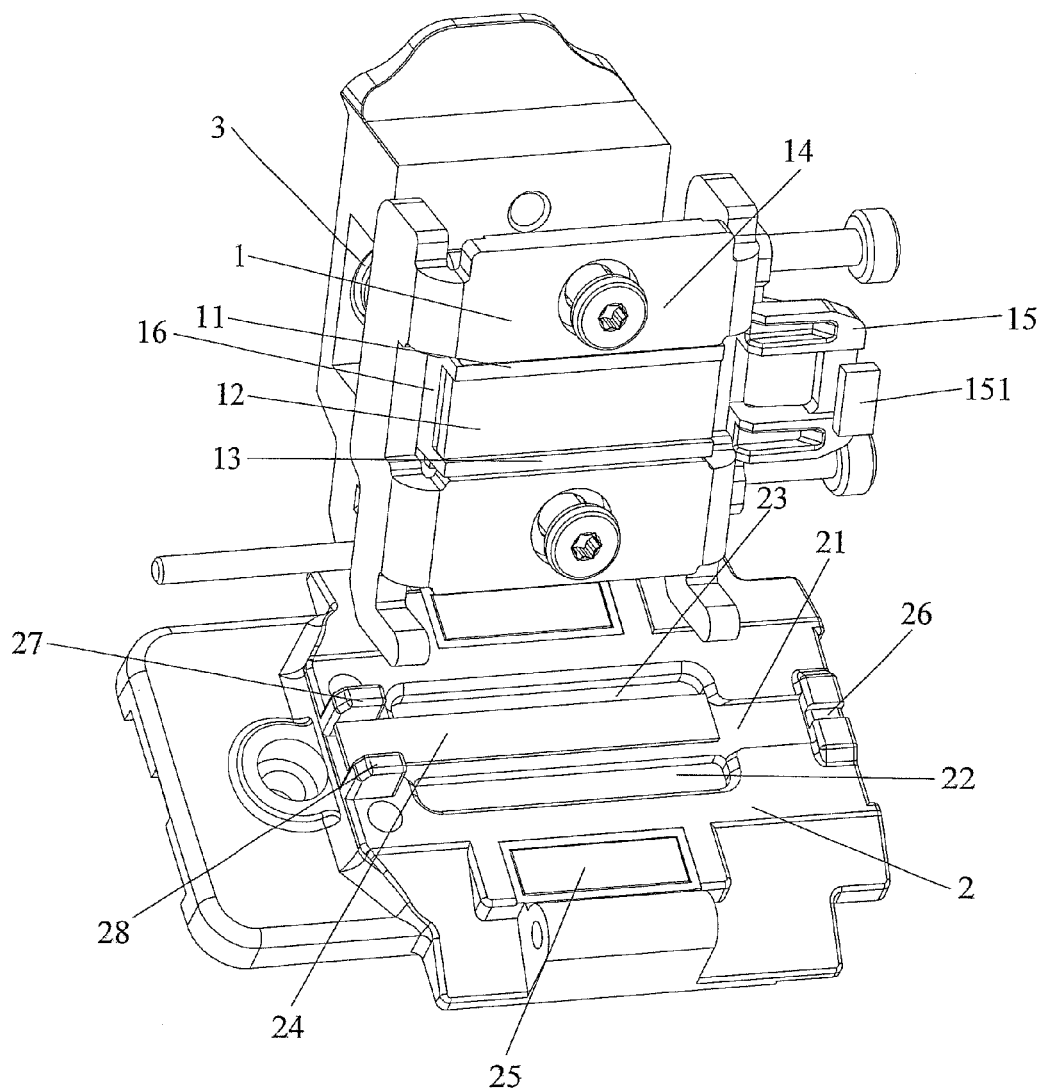
FIG. 1 is a structural diagram of a new multi-functional splicing clamp of the present invention in an open state.
Figure 2:
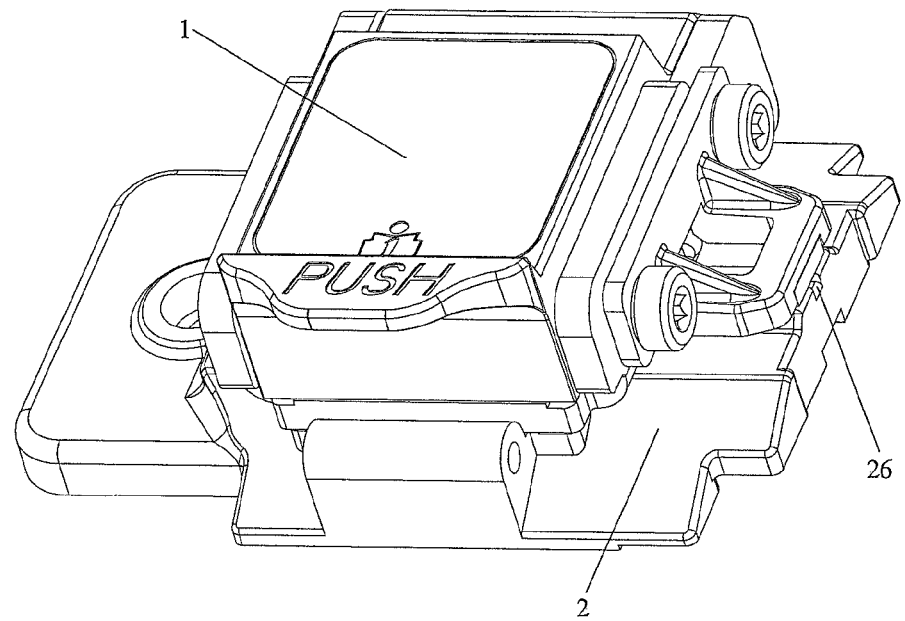
FIG. 2 is a structural diagram of a new multi-functional splicing clamp of the present invention in a closed state.
Figure 3:
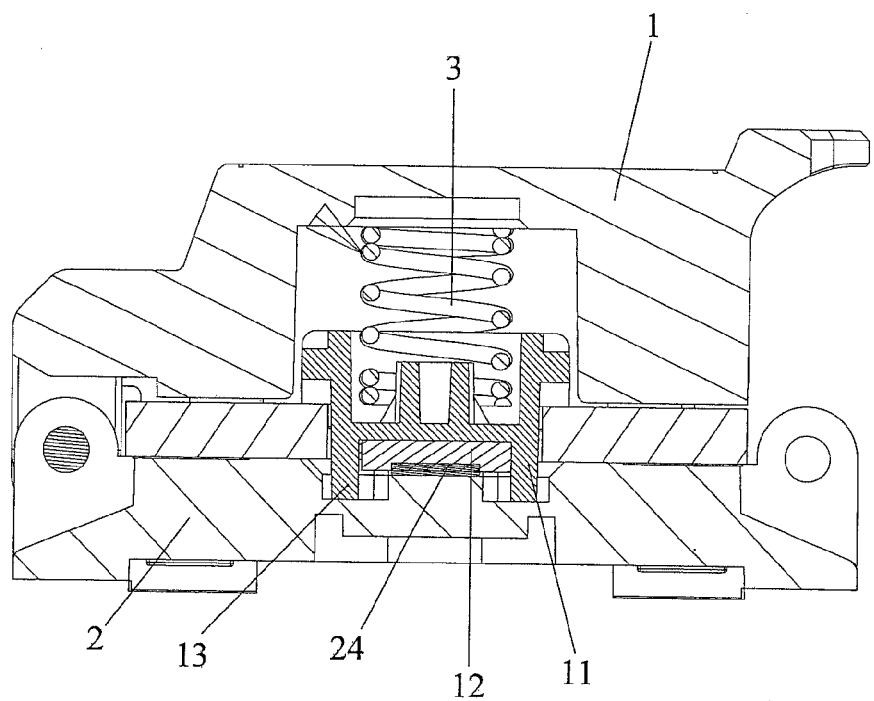
FIG. 3 is a sectional view of a new multi-functional splicing clamp of the present invention in the closed state.

Please refer to FIGS. 1-3. A new multi-functional splicing clamp of the present invention, for use in a fiber splicing device, comprises a clamp body 2 and a clamp cover body 1; one side of said clamp body 2 is pivotally connected to the said clamp cover body 1 via rotating shaft, and said clamp body 2 is provided with a fiber-carrying pad 24 and said clamp cover body 1 is provided with an abutment structure which can abut said fiber-carrying pad 24.

The abutment structure includes an abutment pad 12 and a limiter body 16; the upper and lower sides of said limiter body 16 may be symmetrically provided with a first convex body 11 and a second convex body 13, between which a groove is formed; said abutment pad 12 may be connected to the groove by means of splicing; the first convex body 11 and the second convex body 13 protrude out of said abutment pad 12, the projecting lengths of the first convex body 11 and the second convex body 13 should be long enough to prevent said limiter body 16 from falling into a gap behind said limiter body 16 when clamping optical fibers. Said limiter body 16 is connected to the said clamp cover body 1 via an elastic body 3; said elastic body 3 includes a spring, one end of which is connected to the said limiter body 16 and the other end is connected to said clamp cover body 1. In this embodiment of the present invention, the spring preferably has a tensile force of 2.8N and the fiber-carrying pad 24 and abutment pad 12 preferably are the rubber bodies.

The clamp body 2 is provided with a first groove 21. In this embodiment of the present invention, the first groove 21 may be rectangular and may be integrally formed with said clamp body 2; a fiber-carrying pad 24 is provided on the first groove 21. Said fiber-carrying pad 24 may completely cover said first groove 21, or it may incompletely cover said first groove 21.

Said clamp body 2 is further provided with a fiber-carrying slot 26. In this embodiment of the present invention, the fiber-carrying slot 26 is rectangular, and it is linked with said first groove 21, wherein the fiber-carrying slot has a bottom and the first groove has a bottom, wherein the bottom of said fiber-carrying slot 26 is higher than the bottom of said first groove 21. Said clamp cover body 1 is provided with an abutment body 151 which can abut said fiber-carrying slot 26. Said clamp cover body 1 is further provided with a fiber press seat 15. In this embodiment of the invention, the fiber press seat 15 is a plastic structure connected to said clamp cover body 1 by a screw. Said abutment body 151 is preferably a rubber body and is connected to said fiber press seat 15 by means of gluing.

The side face of said first groove 21 is provided with the first empty-avoiding slot 22 and the second empty-avoiding slot 23. Said first empty-avoiding slot 22 matches with said first convex body 11, and said second empty-avoiding slot 23 with said second convex body 13. The matching of said first empty-avoiding slot 22 and said second empty-avoiding slot 23 with said first convex body 11 and said second convex body 13 could make the clamping process more smooth and the clamping effect better. In this embodiment of the present invention, said first empty-avoiding slot 22 and said second empty-avoiding slot 23 are integrally formed with said clamp body 2.

Said clamp body 2 is further provided with the first stop block 27 and the second stop block 28, which are symmetrically and convexly disposed on the terminal side of said first groove 21. When a rubber-insulated cable or jumper wire is to be clamped, said first stop block 27 and said second stop block 28 could limit the rear end of the rubber-insulated cable or jumper wire.

Said clamp cover body 1 and said clamp body 2 are connected magnetically; said clamp cover body 1 is a magnetizer 14, and said clamp body 2 is provided with several magnetic bodies 25, which could match with said magnetizer 14. In this embodiment of the present invention, the clamp cover body is made of steel with magnetic conductivity, and there are two magnetic bodies 25, which are preferably strong magnets with 5000 GS.

The fiber-carrying pad 24, abutment pad 12 and abutment body 151 in the present invention may be made of a rubber material, and can prevent wire cables from sliding during clamping.

When used, the rubber-insulated cable, jumper wire or 2.5 mm optical cable is placed on said fiber-carrying pad 24. The exposed fiber after the wire cable is stripped will be stuck in the fiber-carrying slot 26. When said clamp body 2 and said clamp cover body 1 are closed, the spring pushes said abutment pad 12 outward so as to push against a rubber-insulated cable, jumper wire or 2.5 mm optical cable on the fiber-carrying pad to hold down the rubber-insulated cable, jumper wire or 2.5 mm optical cable. When a jumper wire or 2.5 mm optical cable is clamped, said abutment body 151 could hold down 900 um optical fiber on said fiber-carrying slot 26, making it possible to hold the entire optical fiber in a horizontally fixed state to facilitate fiber splicing to achieve better splicing results.

When a 900 um fiber, 250 um fiber or 80 um fiber is to be clamped, it is put on said fiber-carrying pad 24 to make its front end extend out of said fiber-carrying slot 26. When said clamp body 2 and said clamp cover body 1 are closed, the spring pushes said abutment pad 12 outward so as to push against the 900 um fiber, 250 um fiber or 80 um fiber on the fiber-carrying pad 24 to hold down the 900 um fiber, 250 um fiber or 80 um fiber. When a 900 um optical fiber is clamped, said abutment body 151 could hold down 900 um optical fiber on said fiber-carrying slot 26, making it possible to hold the entire optical fiber in a horizontally fixed state to facilitate fiber splicing to achieve better splicing results.

During use, a new multi-functional splicing clamp of the present invention should be symmetrically installed in an optical fiber fusion splicer to simultaneously hold down two fibers for fiber splicing.

A new multi-functional splicing clamp of the present invention may simultaneously match with wire cables with big diameter differences such as rubber-insulated cables, jumper wires, 2.5 mm optical cables, 900 um optical fibers, 250 um optical fibers, and 80 um optical fibers. When different types of fibers are fusion spliced, it is unnecessary to replace the clamp and the splicing operation can be directly carried out. This can greatly improve efficiencies. Furthermore, a new multi-functional splicing clamp of the present invention can be directly installed in an optical fiber fusion splicer. Once a cut optical fiber is placed in the clamp, splicing can be performed, thus avoiding the complicated processes in the prior art wherein the optical fiber and clamp must be removed together from a cutting knife and then the removed fiber and clamp are fixed together and installed in a fusion splicer for fiber splicing, and achieving convenient operation and higher efficiencies.

The above describes some embodiments of this patent application. However, this application is not restricted to the described embodiments. Any variations of such embodiments that can be appreciated by professional skilled artisan in this field shall be within the scope of protection of this application.

What is claimed is:
1. A multi-functional splicing clamp for use with a fiber splicing device, comprising: a clamp body and a clamp cover body; wherein one side of said clamp body is pivotally connected to said clamp cover body, and wherein said clamp body is provided with a fiber-carrying pad and said clamp cover body is provided with an abutment structure, which can abut said fiber-carrying pad; said abutment structure includes an abutment pad having a thickness, which is connected to said clamp cover body via an elastic body, wherein said clamp body is provided with a first groove, on which said fiber-carrying pad is disposed;

wherein said clamp body is further provided with a fiber-carrying slot, which is linked with said first groove; wherein the fiber-carrying slot has a bottom and the first groove has a bottom, wherein the bottom of said fiber-carrying slot is higher than the bottom of said first groove, and wherein said clamp cover body is provided with an abutment body which can abut said fiber carrying slot;

wherein said abutment structure further comprises a limiter body, whose upper and lower sides are symmetrically provided with a first protruding body and a second protruding body, and between which a groove having a depth is formed; wherein said abutment pad is disposed in said groove on said limiter body between said first protruding body and said second protruding body; wherein said limiter body is connected to said clamp cover body via said elastic body; wherein the depth of the groove is greater than the thickness of the abutment pad such that the first protruding body and the second protruding body extend from a bottom surface of the groove further than a first surface of said abutment pad that is opposite a second surface of the abutment pad that faces the bottom of the groove;

wherein said clamp cover body is further provided with a fiber press seat, on which said abutment body is disposed.

2. The multi-functional splicing clamp according to claim 1, wherein said elastic body comprises a spring, one end of which is connected to said limiter body and the other end is connected to said clamp cover body.

3. The multi-functional splicing clamp according to claim 2, wherein said spring is a mechanical spring with a tensile force of 2.8N.

4. The multi-functional splicing clamp according to claim 1, wherein a side face of said first groove is provided with a first empty-avoiding slot and a second empty-avoiding slot; wherein said first empty-avoiding slot is configured to accommodate said first protruding body and said second empty-avoiding slot is configured to accommodate said second protruding body.

5. The multi-functional splicing clamp according to claim 1, wherein said fiber-carrying pad, said abutment pad, and said abutment body are rubber bodies.

6. The multi-functional splicing clamp according to claim 1, wherein said clamp body is further provided with a first stop block and a second stop block, which are symmetrically disposed on a terminal side of said first groove.

7. The multi-functional splicing clamp according to claim 1, wherein said clamp cover body and said clamp body are configured to be connected magnetically in a closed state; wherein said clamp cover body is a magnetizer, and said clamp body is provided with a plurality of magnetic bodies.

* * * * *